United States Patent [19]
Odink et al.

[11] Patent Number: 4,900,491
[45] Date of Patent: Feb. 13, 1990

[54] METHOD FOR FORMING MINIATURE CERAMIC ARTICLES WITH SMALL BORES

[75] Inventors: Harry J. Odink, Morgan Hill; Walt D. Carbonell, San Jose, both of Calif.

[73] Assignee: Ampex Corporation, Redwood City, Calif.

[21] Appl. No.: 8,515

[22] Filed: Jan. 29, 1987

[51] Int. Cl.$^4$ ................................................ C04B 33/32
[52] U.S. Cl. ........................................ 264/59; 264/56; 264/313; 264/317; 264/63
[58] Field of Search ............ 264/59, 56, 63, 313, 264/317

[56] References Cited

U.S. PATENT DOCUMENTS

| | | | |
|---|---|---|---|
| 2,171,006 | 8/1939 | Morgan | 264/59 |
| 2,376,742 | 5/1946 | Wempe | 49/79 |
| 2,506,244 | 5/1950 | Stopka | 264/59 |
| 2,875,501 | 3/1959 | Gravley | 264/59 |
| 3,345,160 | 10/1967 | Miccioli | 264/59 |
| 3,385,553 | 5/1968 | Braun | 249/142 |
| 3,437,723 | 4/1969 | Habermann | 264/59 |
| 3,499,066 | 3/1970 | Murray | 425/405 H |
| 3,502,755 | 3/1970 | Murray | 264/59 |
| 3,539,667 | 11/1970 | Nameishi | 264/56 |
| 3,576,050 | 4/1971 | Thomas | 425/405 H |
| 3,608,036 | 9/1971 | Peeso | 264/158 |
| 3,632,243 | 1/1972 | Mott | 425/78 |
| 3,824,051 | 7/1974 | Van Leemput | 425/8 |
| 3,907,949 | 9/1975 | Carlson | 264/6 |
| 4,330,251 | 5/1982 | Lebas et al. | 425/405 H |
| 4,591,470 | 5/1986 | Goto et al. | 264/59 |

*Primary Examiner*—James Derrington
*Attorney, Agent, or Firm*—Harry G. Thibault; Richard P. Lange

[57] ABSTRACT

A method and apparatus for manufacturing ceramic parts which have a small bore relative to the outside diameter of the part.

11 Claims, 1 Drawing Sheet

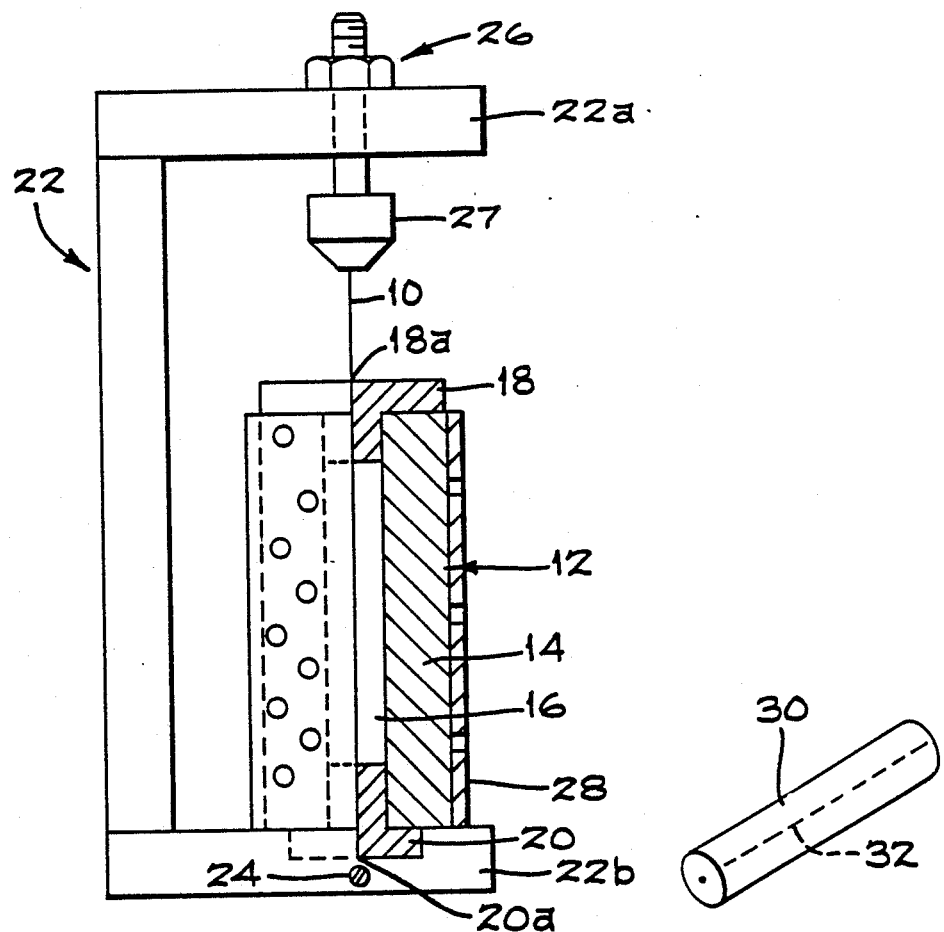
FIG_1
FIG_3
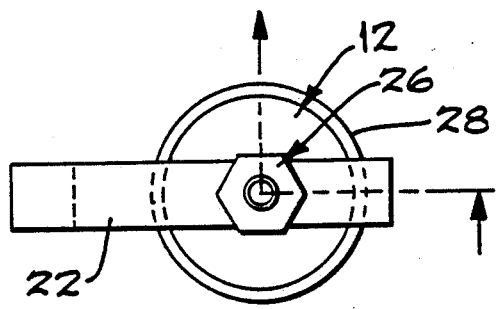
FIG_2

METHOD FOR FORMING MINIATURE CERAMIC ARTICLES WITH SMALL BORES

The present invention relates to a method and apparatus for forming small ceramic articles and in particular to a method and apparatus of forming such articles in which a relatively small bore is provided during the forming of the ceramic part.

Although the method of forming an article about a member as flexible as a ribbed cord or as rigid as hardened steel is known, the spectrum of processes available do not provide the specific requirements of certain significant industrial applications. In one known process a ribbed cord mounted under tension is dragged through a slurry in a series of passes, allowing the dampened particles of the slurry to adhere thereto. In each subsequent pass through the slurry, particles continue to build up on the cord and the attached particles in layers. After the article is built up in a cylindrical-like shape having a suitable diameter, the formed member is processed to harden it, then cut to size, and then the cord is burned away to define a passage through the finished article. However, that passage is ribbed, like the cord that defined it, to provide a passage of uncertain and uneven diameter in the finished article, a passage which is not suitable for certain electronic applications which demand precision and accuracy in the diameter of the bore as well as a smooth bore having a diameter of ten mils or less.

In a molding process in which the bore is defined by a steel mandrel, typically that mandrel is supported at one end of the mold so as to be free standing and not under tension and therefore must be of sufficient diameter to be free-standing. Even though the bore of the finished article may be substantially smooth, it can typically be no less than forty (40) mils in diameter and completely unsuitable for applications of industrial significance which require parts having smooth bores of 10 mils or less, such as very small toroids used in one-turn electronic core devices or certain complex electronic feed-through devices used to isolate small conductors in miniature electronic packages.

Accordingly, there is a problem in the known processes in that these processes fail to provide a method and apparatus for producing a formed part having a central bore of very small diameter (10 mils or less), that central bore also being very smooth, the wall or walls of such part being relatively thick when compared to the bore. Such a part has substantial importance in industrial applications which require ceramic parts of the dimensions described above, two notable examples of such applications being the miniature toroid, wherein in certain microwave applications using ferrite core materials, the size of the toroid decreases, to require a hole as small as 2 mils to accommodate the one-turn wire associated with the ferrite core. Further, in certain complex electronic feed-through devices where an electronics package is miniaturized, a device isolating a relatively small conductor must have a bore as small as 2 mils to accommodate that conductor.

Accordingly, the present invention provides a method and apparatus for of manufacturing formed parts having very small diameter central bores and a wall or walls surrounding the bore defining an outside diameter which is relatively thick when compared to that of the bore. Such method includes the provision of a relatively thin flexible member such as a wire which defines the bore and the provision of a hollow mold having a central opening to receive the wire. The mold has a hollow chamber to receive a moldable material forming the part, opposite end members to close the hollow chamber and is divisible into separate parts to permit the mold to be opened to allow the moldable material to be added to the center chamber of the mold.

The wire is inserted into the mold, passing it through opposite ends of the central core, and secured to a suitable rigid U-shaped structure so that the wire can be tensioned. With the member and the mold in place on the rigid structure, the mold is opened to insert the moldable material into the central core of the mold. Typically the materials used are ceramic and range in consistency from a particulate material to a semi-fluid flowable plastic. After the moldable material is placed in the central chamber of the mold the mold is closed and the material in the mold core is placed, e.g., in a liquid pressure chamber, to pressurize the mold and form the part. Thereafter the mold is opened to remove the processed part. Finally the wire is removed from the processed part to produce a pressure formed part of powdered material and having a bore of 10 mils diameter or less through a part having an outside diameter of ½" (0.500) or less.

BRIEF DESCRIPTION OF THE DRAWINGS

A better understanding of the invention can be obtained by considering the following detailed description together the the accompanying drawings which illustrate a preferred embodiment of the present invention in which FIG. 1 is a side elevation, partially in section, of the structure used in accordance with the present invention for making small formed parts having very small internal diameters;

FIG. 2 is a plan view of the structure of FIG. 1; and

FIG. 3 is a perspective view of an article produced by the structure of FIG. 3.

DETAILED DESCRIPTION

The present invention relates to a method and apparatus for forming parts having bores of very small diameter. Industrial applications of significance which employ such parts include small toroids made of ferritic core materials, used in one-turn memory devices employed in certain microwave applications. Another notable application is the use of such parts in the isolation of relatively thin conductors in certain feed-through devices incorporated in complex miniaturized electronics packages.

The method begins by mounting a very thin filament or wire 10 on a rigid U-shaped frame 22. In the preferred embodiment the wire 10 is metallic, but it could be comprised of any other organic or inorganic material which is relatively smooth, e.g., a drawn monafilament line. The filament 10 is mounted on an upper leg 22a of the frame 22 to a pin vise 27. A cylindrical mold 12 is provided for mounting on the frame 22, which mold 12 in the preferred embodiment is formed of silicone rubber. The mold 12 has a central body portion 14 surrounding a central chamber 16 which may be of any useable shape, e.g., of rectangular or oval cross-section, but in the preferred embodiment has a circular cross-section to define a cylindrical chamber 16, and includes a top closure 18 and a bottom closure 20 preferably formed of the same material as the main body portion 14.

In the preferred embodiment both the top closure 18 and the bottom closure 20 are each formed as a stopper but the form of top and bottom closures 18, 20 is simply a matter of design choice. The filament 10 passes through respective openings 18a and 20a through the top closure 18 and the bottom closure 20 of the mold 12 to be aligned axially with the chamber 16 of the mold 12. A lower leg 22b of the frame 22 receives a lower end of the wire 10 on a set screw 24 provided on the lower leg 22b of the frame 22 to hold the wire 10 in place. A tensioning member 26 connected to the pin vise 27, is provided on the upper leg 22a of the frame 22 for tensioning the wire 10. For support, a perforated cage 28 is mounted so as to surround the mold 12. A detent (not shown) provided on the lower leg 22b of the frame 22 holds the cage 28 and aids in the alignment of the mold 12 on the wire 10.

To form a pressure formed cylindrical part 30 as shown in FIG. 3, the top closure 18 is slid up the wire 10 to provide access to the central chamber 16. Then a suitable ceramic material, mixed with a suitable binder, e.g., polyvinyl alcohol (PVA), is introduced into the chamber 16 to provide the raw material of the part 30. Generally the structure shown in FIGS. 1 and 2 is useful with powder compaction processes and such processes are well suited for use with both oxide and non-oxide ceramic materials, having particles of generally spherical shape. In the preferred embodiment, the ceramic material, PVA mixture results in a flowable particulate roughly the consistency of granulated sugar. A cylindrical part 30 is formed by the mold 12, however, the chamber 16 could readily take other forms to produce pieces of rectangular or oval cross-section, for example.

After the chamber 16 of the mold 12 is filled, the top closure 18 is dropped into place and the mold is placed in any suitable structure (not shown), e.g. a liquid-filled compression chamber which can exert isostatic pressure on the mold 12 and its filled central chamber 16 to compress the ceramic materials therein. During the powder compaction process, interaction between the ceramic particles and the binder occurs to aid in the formation of part 30. Once the process is complete the wire 10 can be removed from the frame 22 and the mold 12 removed from the part 30. Because the ceramic material used in the powder compaction process "springs back" slightly when the pressure on the mold 12 is removed, the wire 10 can be easily removed from the part 30 to form the finished part. In those cases where the material used does not provide a "spring back" reaction after processing, an organic filament of suitable size and smoothness can be used, to be burned away after the molding process.

The finished part 30 has a bore 32 which is substantially smooth and very small. For example, in the arrangement above described, the wire filament 10 used is about 5 mils (0.005") and the outside diameter of the part 30 is about 0.1875" so that the ratio of the outside diameter of the part 30 to the diameter of the bore 32 is roughly 35 to 1. The process can produce parts having bores within a range of 2-10 mils. The finished piece can be as large as one-half inch (0.5") in diameter. Pieces larger than that are difficult to handle by this process.

Although the mixture of ceramic material and binder used in the process of the preferred embodiment produced a flowable particulate structure, other combinations of ceramic and binder sometimes produce a resultant mixture with the consistency of a semi-fluid flowable plastic. Because the resulting product is ceramic, it is always cured, to sinter the piece, at curing temperatures ranging from 900°–1500° C. Of course other processes may be incorporated into the method and apparatus used to form parts as described. Instead of subjecting the part in the mold to isotatic pressure, elevated temperatures could be applied to the mold to form the part. Or the material in the mold may experience a chemical reaction to form the part.

The structure produced by the method and apparatus of the present invention is simply not possible through the use of known technologies. Since the structure produced by the method of the present invention is critical to such advanced electronic applications as high frequency, microwave ferritic core structures employing a miniature toroid as a one-turn electronic core device or complex electronic packages employing feed-through devices to isolate thin conductors, the present invention offers a substantial advantage in the above-described applications and other applications for which it is particularly suited and in fact appears to fill a void with respect to the above-described applications.

The foregoing description has set forth a preferred embodiment of the present invention. However it should be recognized that further embodiments are possible. Accordingly, the claims which follow define the breadth of the present invention.

What is claimed is:

1. A method of forming parts, each part formed from a ceramic moldable material and having a central bore, the diameter of the central bore being relatively small with respect to the cross-section of the part, the part formed in a mold mounted on a suitable support structure, the method comprising:

mounting a relatively thin flexible member on the support structure under tension;

mounting a mold on the support structure with the flexible member extending therethrough, said mold having a body cavity for receiving the ceramic moldable material, said body cavity defining a body part having a cross-section substantially larger than the cross-section of the then flexible member passing therethrough;

enclosing the mold in a perforated cage provided on the support structure, said cage enclosing and supporting the mold;

inserting the ceramic moldable material into the mold to surround the tensioned flexible member along the length of the member within the mold; and removing the flexible member from the formed part.

2. A method a claimed in claim 1 wherein the ceramic moldable material in the mold is formed into a part under an isostatic pressure condition.

3. A method as claimed in claim 1 wherein the ceramic moldable material in the mold is formed into a part under an elevated temperature condition.

4. A method as claimed in claim 1 where the ceramic moldable material in the mold is formed into a part during a chemical reaction of said material.

5. A method as claimed in claim 1 wherein the ceramic moldable material inserted into the mold is combined with a suitable binder.

6. A method as claimed in claim 1 wherein the thin, flexible member is mounted under tension between opposite legs of a U-shaped support member.

7. A method as claimed in claim 1 wherein the thin, flexible member comprises a smooth organic material which is burned out of the processed part.

8. A method as claimed in claim 1 wherein an adjusting means associated with the support structure adjusts the amount of the tension applied to the thin, flexible member.

9. A method as claimed in claim 8 wherein one end of the thin, flexible member is retained by a set screw associated with the adjusting means.

10. A method of claimed in claim 9 wherein the adjusting means controls the amount of tension in the flexible member by rotating a tensioning member securing an end of the thin, flexible member opposite the set screw.

11. A method as claimed in claim 10 wherein the thin flexible member is fixedly secured to the tensioning member by a pin vise.

* * * * *